United States Patent
Ogawa

(10) Patent No.: US 10,179,516 B2
(45) Date of Patent: Jan. 15, 2019

(54) VEHICLE POWER CONTROL SYSTEM AND POWER CONTROL METHOD

(71) Applicant: Takayuki Ogawa, Obu (JP)

(72) Inventor: Takayuki Ogawa, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 85 days.

(21) Appl. No.: 14/422,748

(22) PCT Filed: Aug. 6, 2013

(86) PCT No.: PCT/IB2013/001867
§ 371 (c)(1),
(2) Date: Feb. 20, 2015

(87) PCT Pub. No.: WO2014/030059
PCT Pub. Date: Feb. 27, 2014

(65) Prior Publication Data
US 2015/0217653 A1 Aug. 6, 2015

(30) Foreign Application Priority Data

Aug. 22, 2012 (JP) ................................. 2012-182927

(51) Int. Cl.
*B60L 11/18* (2006.01)
*H02J 5/00* (2016.01)
(Continued)

(52) U.S. Cl.
CPC ....... *B60L 11/1816* (2013.01); *B60L 11/1809* (2013.01); *H02J 3/32* (2013.01); *H02J 5/00* (2013.01); *H02J 7/0054* (2013.01); *H02J 7/02* (2013.01); *H02J 7/027* (2013.01); *H02J 7/045* (2013.01); *Y02E 60/721* (2013.01);
(Continued)

(58) Field of Classification Search
CPC .................................................. B60L 11/1809
See application file for complete search history.

(56) References Cited

U.S. PATENT DOCUMENTS 8,030,882 B2 * 10/2011 Ito ............................ B60K 6/48
307/66
2009/0174366 A1 * 7/2009 Ahmad .................. H02J 7/0055
320/114

(Continued)

FOREIGN PATENT DOCUMENTS

JP 2009-27811 2/2009
JP 4977797 * 7/2012 ............ H02J 7/0036
(Continued)

OTHER PUBLICATIONS

JP4977797 translation Sakakibara, Battery System Jul. 2, 2012.*

*Primary Examiner* — Robert Grant
*Assistant Examiner* — Tynese McDaniel
(74) *Attorney, Agent, or Firm* — Finnegan, Henderson, Farabow, Garrett & Dunner, LLP

(57) ABSTRACT

A control device that controls a charging apparatus and a power supplying apparatus stops charging to a secondary battery when a connecting terminal is connected to each of both of a charging terminal and a discharging terminal. Also, the control device continues to stop the charging when the charging-stopped state is detected by the cut-off detecting portion.

4 Claims, 5 Drawing Sheets

(51) Int. Cl.
- *H02J 7/02* (2016.01)
- *H02J 3/32* (2006.01)
- *H02J 7/00* (2006.01)
- *H02J 7/04* (2006.01)

(52) U.S. Cl.
CPC ........ *Y02T 10/7005* (2013.01); *Y02T 10/7072* (2013.01); *Y02T 90/14* (2013.01); *Y04S 10/126* (2013.01)

(56) References Cited

U.S. PATENT DOCUMENTS

| | | | | |
|---|---|---|---|---|
| 2010/0142104 A1* | 6/2010 | Cooper | ............... | H02H 3/32 |
| | | | | 361/49 |
| 2010/0190381 A1* | 7/2010 | Chatterjee | ............ | H01R 39/64 |
| | | | | 439/628 |
| 2011/0031805 A1* | 2/2011 | Yamashita | ............ | B62D 5/046 |
| | | | | 307/9.1 |
| 2012/0286575 A1* | 11/2012 | Park | ............... | H02J 7/0068 |
| | | | | 307/31 |
| 2013/0134787 A1* | 5/2013 | Sakakibara | ............ | H02J 7/0068 |
| | | | | 307/72 |
| 2013/0342163 A1* | 12/2013 | Naruse | ............... | H02J 7/0036 |
| | | | | 320/109 |

FOREIGN PATENT DOCUMENTS

| | | |
|---|---|---|
| JP | 2013-126347 | 6/2013 |
| JP | 2014-3870 | 1/2014 |

\* cited by examiner

VEHICLE POWER CONTROL SYSTEM AND POWER CONTROL METHOD

CROSS-REFERENCE TO RELATED APPLICATIONS

This application is a national phase application of International Application No. PCT/IB2013/001867, filed Aug. 6, 2013, and claims the priority of Japanese Application No. 2012-182927, filed Aug. 22, 2012, the content of both of which is incorporated herein by reference.

BACKGROUND OF THE INVENTION

1. Field of the Invention

The invention relates to a vehicle power control system provided with a charging terminal for inputting power from outside a vehicle to a secondary battery of the vehicle, and a discharging terminal for outputting power to outside the vehicle from the secondary battery, as well as a power control method.

2. Description of Related Art

Hybrid vehicles having both an engine and an electric motor, and electric vehicle having only an electric motor, and the like are provided with a secondary battery for storing electric power (hereinafter simply referred to as "power") to be supplied to the electric motor. It is possible to have this secondary battery be able to be charged from an alternating current (AC) power supply outside the vehicle, as well as be able to supply power stored in the secondary battery to an AC load outside the vehicle (for example, Japanese Patent Application Publication No. 2009-27811 (JP 2009-27811 A). The AC power supply outside of the vehicle is a commercial power supply, for example, and the AC load outside of the vehicle is a household electrical appliance, for example.

In JP 2009-27811 A, a charging terminal for inputting power from an AC power supply outside the vehicle, and a discharging terminal that outputs power from the secondary battery of the vehicle to an AC load outside the vehicle are formed by a single plug.

In JP 2009-27811 A, when the AC power supply is connected to the common charging/discharging plug, the AC power from the AC power supply is input from the plug, converted to direct current (DC) power by a predetermined inverter, and then charged to the secondary battery. Also, when the AC load is connected to the plug, power stored in the secondary battery is converted to AC power by a predetermined inverter, and supplied to the AC load from the plug.

SUMMARY OF THE INVENTION

The charging terminal can be separated from the discharging terminal. For example, the charging terminal is able to be connected to an AC power supply outside the vehicle via a dedicated charge cable, and the discharging terminal is shaped like a power receptacle of the same shape as a commercial power supply receptacle so as to be able to connect to a household electrical appliance or the like. One end terminal of the charge cable is shaped so as to be able to connect to the charging terminal, and the other end terminal of the charge cable is a receptacle plug of a shape that is able to connect to the discharge terminal or a commercial power supply receptacle.

In this case, if the charging terminal and the discharging terminal of a vehicle are improperly (i.e., mistakenly) connected using a charge cable, for example, a cycle will be created in which power discharged from the secondary battery of the host vehicle is charged to the secondary battery via the discharging terminal, the charge cable, and the charging terminal. Power stored in the secondary battery may then be gradually consumed due to power loss that occurs with this cycle.

In view of this situation, the invention makes it possible to appropriately charge power to a secondary battery from outside, and appropriately supply power from the secondary battery to outside, while preventing improper charging to the secondary battery, in a vehicle power control system provided with a charging terminal for inputting power from outside to a secondary battery, and a discharging terminal for outputting power to outside from the secondary battery, as well as in a power control method.

A first aspect of the invention relates to a power control system for a vehicle, that includes a secondary battery, a charging terminal, a charging apparatus, a discharging terminal, a power supplying apparatus, and a control device. The charging terminal is capable of connecting to a, power supply terminal of a predetermined alternating current power supply. The charging apparatus is configured to convert alternating current power input from the charging terminal to direct current power and charge this direct current power to the secondary battery. The discharging terminal is capable of connecting to a power receiving terminal of a predetermined alternating current load and the charging terminal. The power supplying apparatus is configured to convert the direct current power from the secondary battery to alternating current power and output this alternating current power from the discharging terminal, and includes a cut-off detecting portion. The control device is configured to control the charging apparatus and the power supplying apparatus. The control device is configured to stop charging to the secondary battery when a connecting terminal is connected to each of both the charging terminal and the discharging terminal. Also, the control device is configured to continue to stop the charging when the charging-stopped state is detected by the cut-off detecting portion, and resume charging by cancelling the charging-stopped state when the charging-stopped state is not detected by the cut-off detecting portion.

With this structure, charging to the secondary battery is stopped when the secondary terminal of a host vehicle and a discharging terminal of the host vehicle are improperly connected via a charge cable, for example.

As a result, a cycle in which power discharged from the secondary battery of the host vehicle is charged to the secondary battery via the discharging terminal, the charge cable, and the charging terminal is prevented from occurring. As a result, a problem in which power stored in the secondary battery is gradually consumed due to power loss that occurs with this cycle is able to be avoided.

Also, with this structure, charging to the secondary battery is allowed when the alternating current power supply outside of the vehicle or the discharging terminal of another vehicle is properly connected via a charge cable, for example, to the charging terminal of the host vehicle. The alternating current power supply outside the vehicle is a commercial power supply, for example.

Furthermore, when an alternating current load outside the vehicle is connected via a charge cable, for example, to the discharging terminal of the host vehicle while the alternating current power supply outside the vehicle or the discharging terminal of another vehicle is properly connected via a charge cable, for example, to the charging terminal of the host vehicle, power is able to be supplied to the alternating current load, while charging power to the secondary battery of the host vehicle from the alternating current power supply or the secondary battery of the other vehicle. The alternating current load outside of the vehicle is a household electrical appliance, for example.

The power supplying apparatus may be configured to convert the direct current power from the secondary battery to alternating current power of a predetermined frequency that differs from a standard frequency of a commercial power supply.

The control device may be configured to stop charging to the secondary battery when the connecting terminal is connected to each of both the charging terminal and the discharging terminal, and a frequency of alternating current power input to the charging terminal matches the predetermined frequency that is set by the power supplying apparatus. Also, the control device may be configured to continue to stop the charging when the charging-stopped state is detected by the cut-off detecting portion, and resume charging by cancelling the charging-stopped state when the charging-stopped state is not detected by the cut-off detecting portion.

The control device may be configured to also notify that improper charging is occurring, when continuing to stop the charging.

A second aspect of the invention relates to a power control method of a vehicle that includes a secondary battery, a charging terminal, a charging apparatus, a discharging terminal, a power supplying apparatus, and a control device. The charging terminal is capable of connecting to a power supply terminal of a predetermined alternating current power supply. The discharging terminal is capable of connecting to a power receiving terminal of a predetermined alternating current load and the charging terminal. The power control method of a vehicle of the invention includes converting alternating current power input from the charging terminal to direct current power and charging this direct current power to the secondary battery, with the charging apparatus; converting the direct current power from the secondary battery to alternating current power and outputting this alternating current power from the discharging terminal, with the power supplying apparatus; stopping charging to the secondary battery with the control device when a connecting terminal is connected to each of both the charging terminal and the discharging terminal; and continuing to stop the charging when the charging-stopped state is detected by a cut-off detecting portion provided in the power supplying apparatus, and resuming charging by cancelling the charging-stopped state with the control device when the charging-stopped state is not detected by the cut-off detecting portion.

In the power control method described above, the direct current power from the secondary battery may be converted by the power supply apparatus to alternating current power of a predetermined frequency that differs from a standard frequency of a commercial power supply. Also, charging to the secondary battery may be stopped by the control device when the connecting terminal is connected to each of both the charging terminal and the discharging terminal, and a frequency of alternating current power input to the charging terminal matches the predetermined frequency. Further, charging may continue to be stopped by the control device when the charging-stopped state is detected by the cut-off detecting portion, and the charging-stopped state may be cancelled and charging may be resumed when the charging-stopped state is not detected by the cut-off detecting portion.

The power control method described above may also include notifying, with the control device, that improper charging is occurring, when the charging continues to be stopped.

The invention thus makes it possible to appropriately charge power to a secondary battery from outside, and appropriately supply power from the secondary battery to outside, while preventing improper charging to the secondary battery, in a vehicle power control system provided with a charging terminal for inputting power from outside to a secondary battery, and a discharging terminal for outputting power to outside from the secondary battery, as well as in a power control method.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
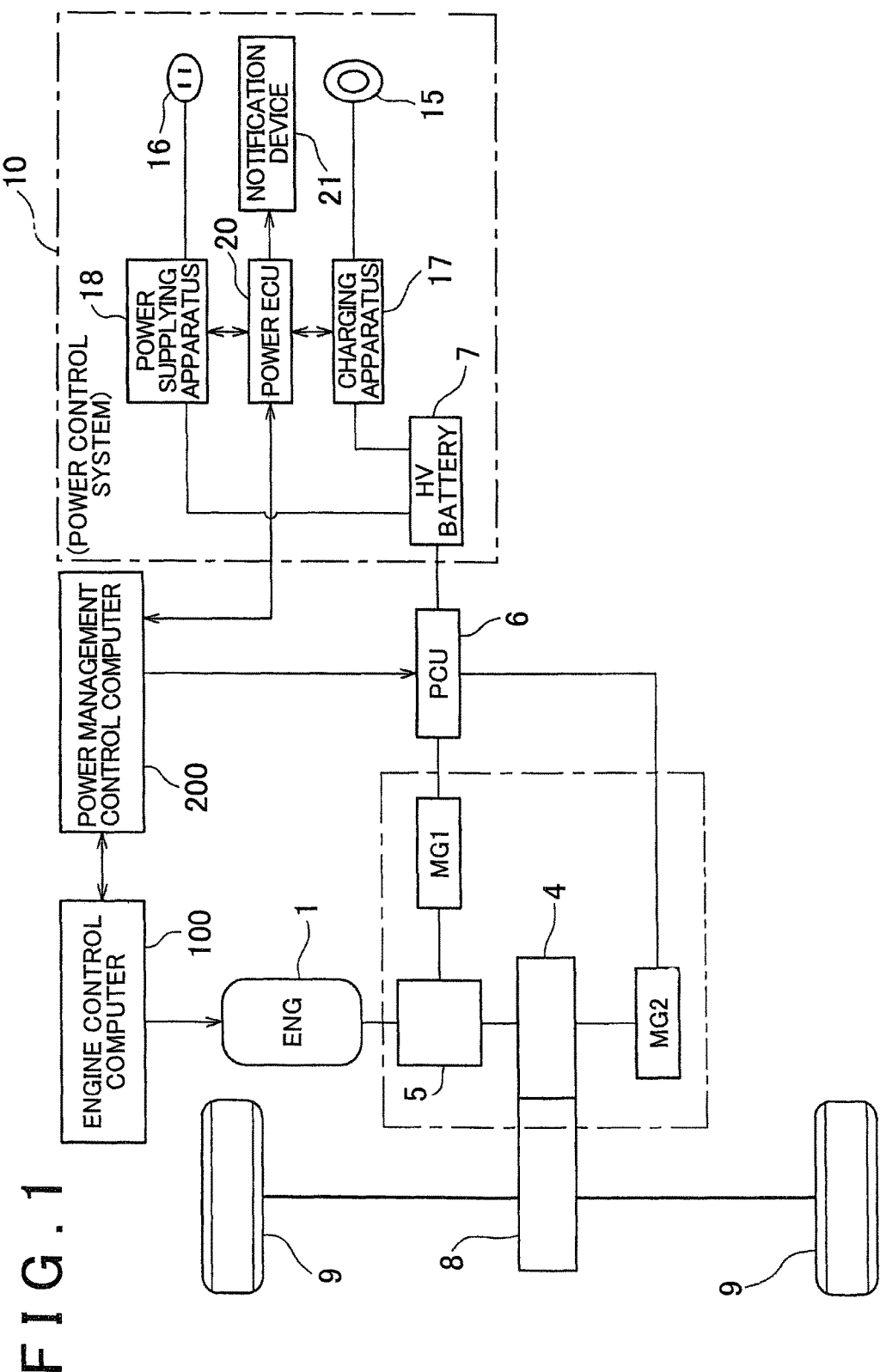
FIG. 1 is a view schematically showing the structure of a hybrid vehicle using one example embodiment of the vehicle power control system of the invention.

Hereinafter, example embodiments of the invention will be described in detail with reference to the accompanying drawings.

FIGS. 1 to 7 are view of one example embodiment of the invention. A vehicle power control system illustrated in this example embodiment is mounted in a front engine-front drive (FF) type hybrid vehicle. The drive system of the hybrid vehicle to which the invention is applied is not limited to an FF system. For example, the drive system may also be a front engine-rear drive (FR) system, or a four-wheel drive (4WD) system or the like.

The hybrid vehicle in this example embodiment includes an engine 1, a motor-generator MG1, a motor-generator MG2, a reduction mechanism 4, a power split mechanism 5, a power control unit (PCU) 6, a HV battery 7 as a secondary battery, a differential 8, driving wheels 9, and a power control system 10 and the like.

Also, in this hybrid system, control that drives the driving wheels 9 with one or both of the engine 1 and the motor-generator MG2 as a drive source is performed based on required torque, target engine output, and target motor torque and the like. For example, in a region where engine efficiency is low, such as during take-off and when running at low speeds, the engine 1 is stopped and the driving wheels 9 are driven using power from only the motor-generator MG2. Also, during normal running, the engine 1 is operated and the driving wheels 9 are driven using power from the engine 1. Furthermore, when operating at a high load such as during full throttle acceleration, power is supplied to the motor-generator MG2 from the HV battery 7 and the power from the motor-generator MG2 is added as assist power to the power from the engine 1.

The engine 1 is controlled by an engine control computer 100. This engine control computer 100 controls the operation of the engine 1 by controlling the throttle opening amount (intake air amount), fuel injection quantity, and ignition timing and the like, based on the accelerator opening amount.

The motor-generators MG1 and MG2 are alternating current (AC) synchronous motors that generate power by a rotor being rotated by three phase alternating current, and each is capable of functioning as both an electric motor and a generator.

The motor-generator MG1 and the motor-generator MG2 are controlled by a power management control computer 200. This power management control computer 200 controls the PCU 6 to direct the motor-generators MG1 and MG2 to regenerate power or provide powering (assist). Regenerated power is charged to the HV battery 7 via the PCU 6.

The motor-generator MG1 that is connected to the power split mechanism 5 is generally often operated as a generator, and may therefore also be referred to simply as "generator". The motor-generator MG1 is also used as a starter motor that performs cranking during startup of the engine 1. Moreover, the motor-generator MG2 that is connected to the reduction mechanism 4 operates mainly as an electric motor, and may therefore also be referred to simply as "motor".

Although not shown in detail, the reduction mechanism 4 is formed by a well-known planetary gear set, for example, and transmits power generated by the engine 1 and the motor-generators MG1 and MG2 to the driving wheels 9 as forward driving force or reverse driving force via the differential 8 and wheel axles, as well as transmits rotating force from the driving wheels 9 to the engine 1 and the motor-generators MG1 and MG2. The driving wheels 9 are front wheels in this example embodiment.

Although not shown in detail, the power split mechanism 5 is formed by a well-known planetary gear set, for example, and distributes the power generated by the engine 1 to a rotating shaft of the motor-generator MG2 and a rotating shaft of the motor-generator MG1. The rotating shaft of the motor-generator MG2 is connected to the driving wheels 9. For reference, although not shown, of the constituent elements of the power split mechanism 5, a ring gear is coupled to the rotating shaft of the motor-generator MG2, a sun gear is coupled to the rotating shaft of the motor-generator MG1, and a carrier is coupled to an output shaft of the engine 1. This power split mechanism 5 also functions as a continuously variable transmission by controlling the rotation speed of the motor-generator MG2.

The engine control computer 100 and the power management control computer 200 are connected together so as to be able to send and receive necessary information. The engine control computer 100 and the power management control computer 200 execute control of the engine 1 based on signals input from various sensors and switches and the like. Control of the engine 1 includes, for example, fuel injection control, igniting timing control, intake air amount control, and air-fuel ratio feedback control. In addition, various other controls described below are also executed.

Although the internal structures are not shown in detail, the engine control computer 100 and the power management control computer 200 both have well-known structures that include a CPU (central processing unit), ROM (program memory), RAM (data memory), backup RAM (non-volatile memory), an input/output interface, and a communication interface, and the like.

Various control programs, and maps that are referenced when executing these various control programs, and the like are stored in the ROM. The CPU performs calculations based on the various control programs and maps stored in the ROM. The RAM is memory that temporarily stores the calculation results of the CPU and data input from the sensors and the like. The backup RAM is non-volatile memory that stores data and the like to be saved when the engine 1 is, shut off. The ROM, the CPU, the RAM, and the backup RAM are all connected together via a bus.

Figure 2:
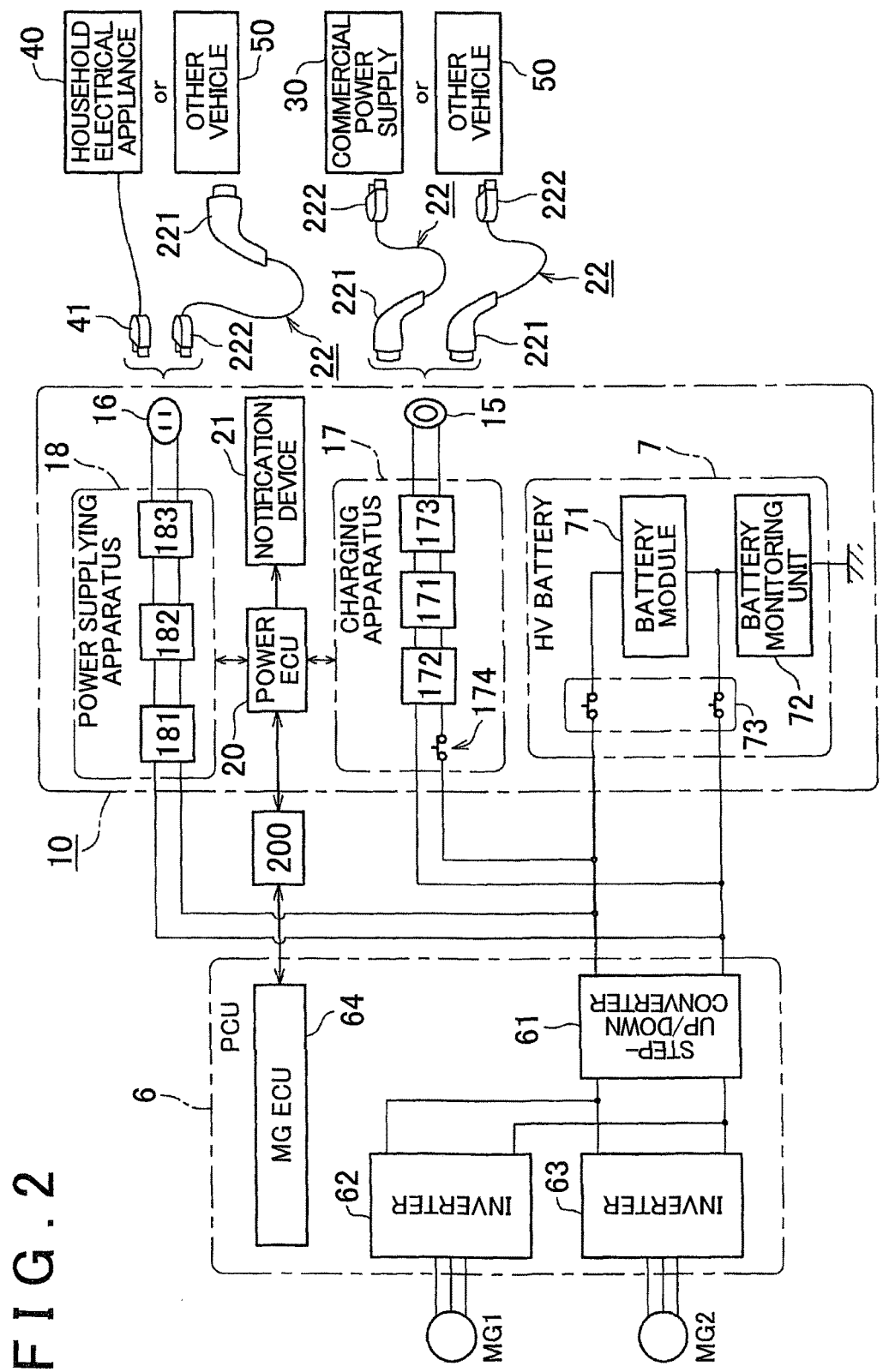
FIG. 2 is a view showing details of part of the structure shown in FIG. 1.

The PCU 6 includes a step-up/down converter 61, inverters 62 and 63, and an MGECU 64, as shown in FIG. 2.

The step-up/down converter 61 is provided to step-up the direct current (DC) voltage of the HV battery 7 and supply it to the inverters 62 and 63. Also, the step-up/down converter 61 steps-down voltage generated by the motor-generator MG1 that has been converted to direct current by the inverter 62, and supplies it (i.e., the stepped-down voltage) to the HV battery 7. Moreover, the step-up/down converter 61 also serves to step-down voltage generated by the motor-generator MG2 that has been converted to direct current by the inverter 63 and supply it (i.e., the stepped-down voltage) to the HV battery 7.

The inverters 62 and 63 are power converting apparatuses that perform conversion between DC current of the HV battery 7 and three-phase AC current of the motor-generator MG1 and the motor-generator MG2.

The inverters 62 and 63 are both three-phase bridge circuits, for example, and are driven by drive signals output from the MGECU 64.

The inverter 62 both converts AC current generated by the motor-generator MG1 by the power of the engine 1 to DC current which it then outputs (i.e., regenerative control), and converts DC current supplied from the step-up/down converter 61 to AC current and drives the motor-generator MG1 (i.e., powering control).

The inverter 63 both converts DC current supplied from the step-up/down converter 61 to AC current and drives the motor-generator MG2 (i.e., powering control), and converts AC current generated by the motor-generator MG2 during regenerative braking to DC current which it then outputs (i.e.; regenerative control).

The MGECU 64 is a well-known structure that includes a CPU, ROM, RAM, backup RAM, an input/output interface, and a communication interface and the like. The MGECU 64 receives an output requirement sent from the power management control computer 200, generates drive signals for the step-up/down converter 61 and the inverters 62 and 63 based on this output requirement and the like, and then outputs these drive signals to the step-up/down converter 61 and the inverters 62 and 63.

The HV battery 7 is a DC power supply that mainly stores power for driving the motor-generators MG1 and MG2, and includes a battery module 71 that is a high-voltage power supply for running, a battery monitoring unit 72 that monitors the battery module 71, and a system main relay 73 and the like.

The battery module 71 is configured to supply power to drive the motor-generators MG1 and MG2, and store power generated by the motor-generators MG1 and MG2. This battery module 71 is a nickel-metal hydride battery or a lithium-ion battery capable of charging and discharging, for example.

Although not shown, various sensors and the like are connected to the battery monitoring unit 72. Among these sensors are a current sensor that detects a charge-discharge current of the battery module 71, a voltage sensor that detects a voltage of the battery module 71, and a temperature sensor that detects a temperature of the battery module 71 (i.e., a battery temperature).

Also, the battery monitoring unit 72 outputs information relating to the battery module 71 to the power management control computer 200. Information relating to the battery module 71 is the charge-discharge current, the voltage, and the battery temperature. From this, the power management control computer 200 calculates a SOC (State of Charge) of the battery module 71 based on an integrated value of the charge-discharge current, and calculates an input limit Win and an output limit Wout based on the SOC and the battery temperature.

The system main relay 73 is provided between the battery module 71 and the PCU 6 to connect or disconnect the battery module 71 to/from the PCU 6. The system main relay 73 is switched between an on state and an off state based on a control signal from the power management control computer 200.

Also, when the system main relay 73 is closed (i.e., on), power from the battery module 71 is able to be supplied to the PCU 6, and the battery module 71 is able to be charged by power supplied from the PCU 6. Also, when the system main relay 73 is open (i.e., off), the battery module 71 is able to be electrically cutoff from the PCU 6.

The power control system 10 for a vehicle according to the invention has a charging function for receiving power from an AC power supply outside of the vehicle to the HV battery 7 and charging it to the HV battery 7, and a power supplying function for supplying (i.e., discharging) power in the HV battery 7 to an AC load outside of the vehicle. The AC power supply outside of the vehicle corresponds to a commercial power supply 30 or another vehicle 50, and the AC load outside of the vehicle corresponds to a household electrical appliance 40 or the other vehicle 50.

Figure 5:
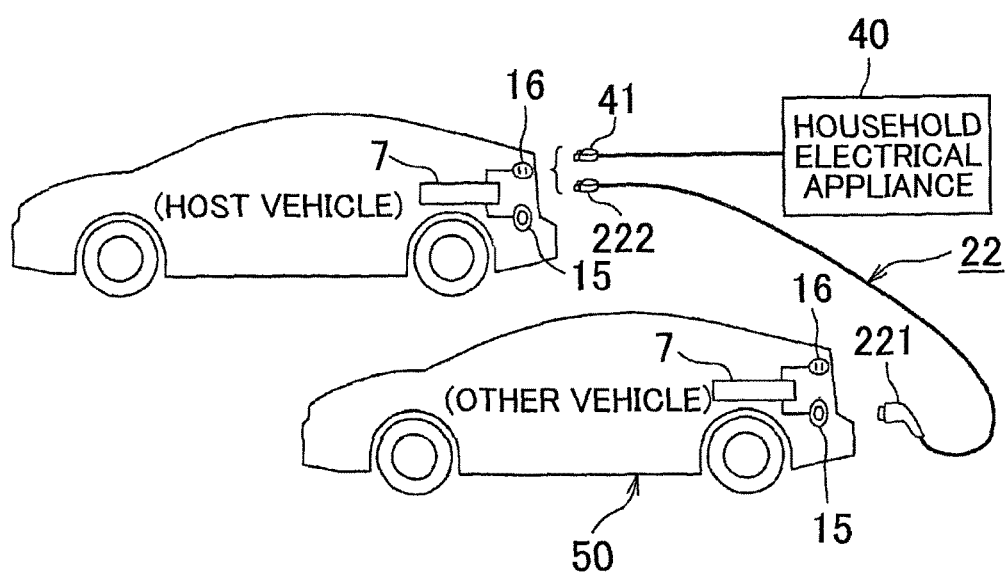
FIG. 5 is a view showing a state in which an emergency power supply outlet of the hybrid vehicle in FIG. 1 is properly connected to a receptacle plug of a household electrical appliance or another vehicle via a charge cable.
Figure 6:
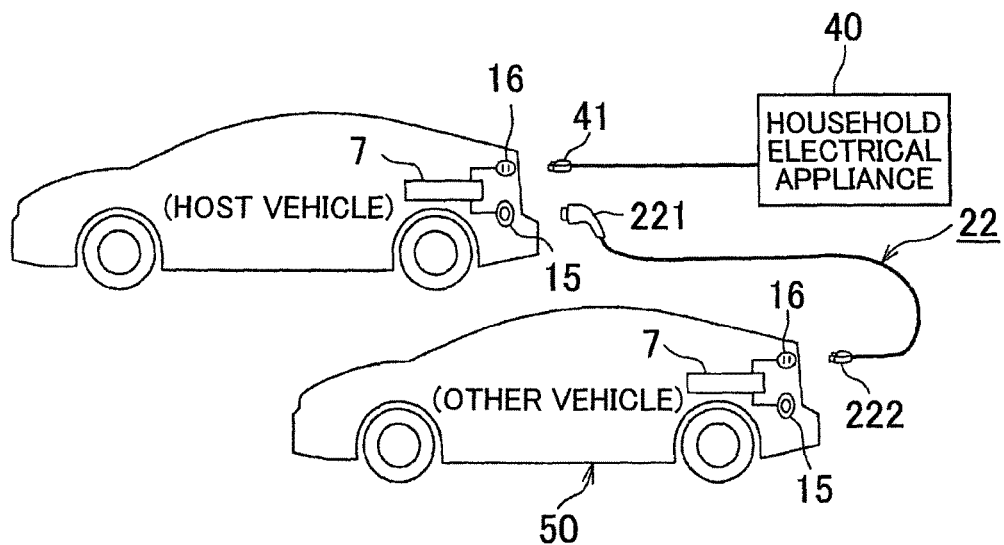
FIG. 6 is a view of a state in which another vehicle is properly connected via a charge cable to a charging inlet of the hybrid vehicle in FIG. 1, and a receptacle plug of a household electrical, appliance is connected to an emergency power supply outlet of the hybrid vehicle in FIG. 1.
Figure 7:
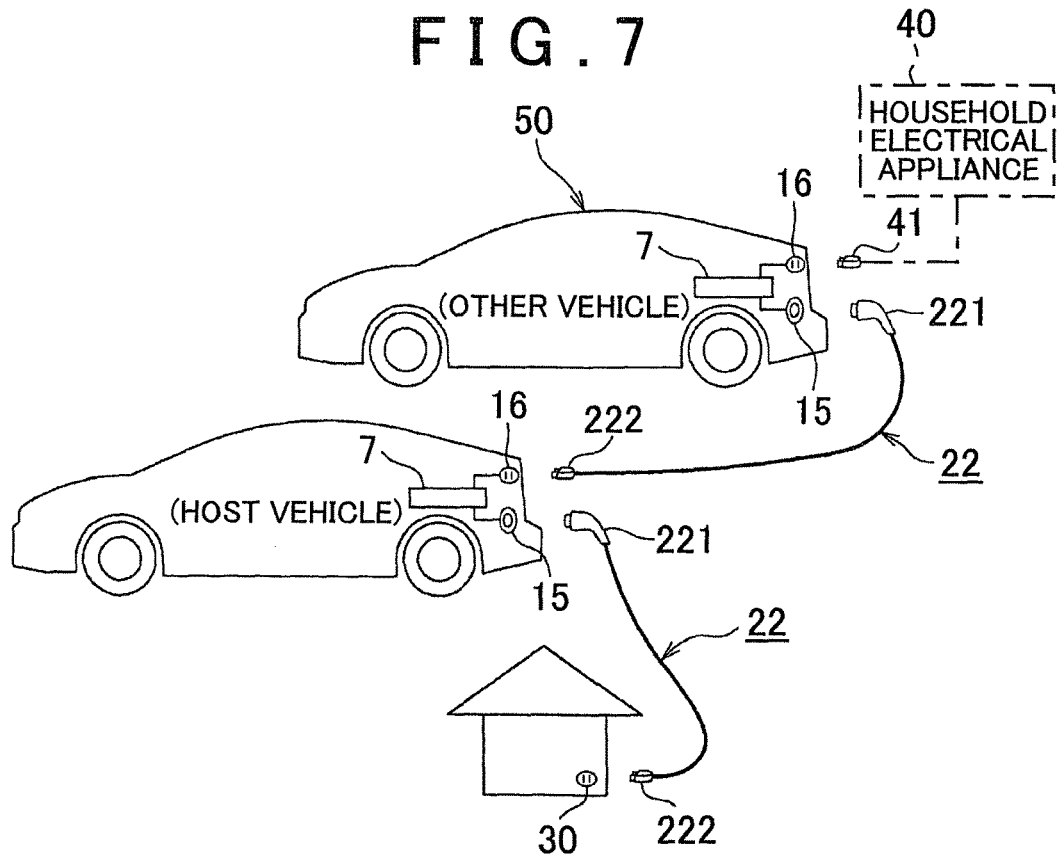
FIG. 7 is a view of a state in which commercial power supply is properly connected via a charge cable to a charging inlet of the hybrid vehicle in FIG. 1, and another vehicle is properly connected via a charge cable to the emergency power supply outlet of the hybrid vehicle in FIG. 1.

The other vehicle 50, which is shown in FIGS. 5 to 7, is configured just like the hybrid vehicle in this example embodiment.

The hybrid vehicle in this example embodiment has a charging function and a power supplying function according to the power control system 10, and is thus referred to as a so-called plugin hybrid vehicle.

This power control system 10 includes a HV battery 7, a charging inlet 15, an emergency power supply outlet 16, a charging apparatus 17, a power supplying apparatus 18, a power ECU 20, and a notification device 21 and the like.

A charge cable 22 is used to enable an AC power supply outside of the vehicle to be connected to the charging inlet 15, as well as enable the other vehicle 50 to be connected to the emergency power supply outlet 16.

Figure 4:
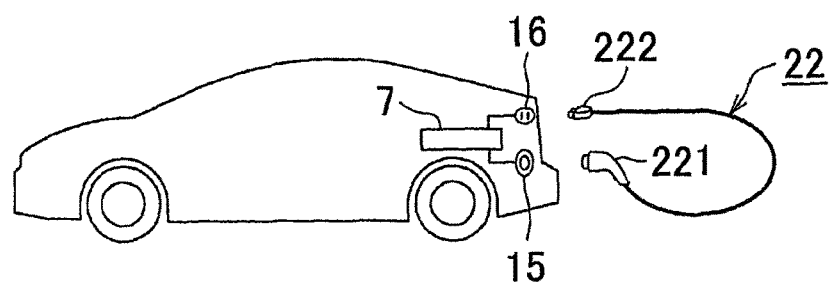
FIG. 4 is a view a state in which a charging inlet and an emergency power supply outlet (receptacle) in the hybrid vehicle in FIG. 1 are improperly connected by a charge cable.

In this example embodiment, as shown in FIG. 4, for example, when the charging inlet 15 is improperly connected to the emergency power supply outlet 16 via the single charge cable 22, this improper connection is able to be detected and a response that involves stopping the charging to the HV battery 7 and notifying a user of the vehicle or the like of this improper connection is possible.

These improper connection detection and response functions are mainly executed by a charge cut-off relay 174 that is used as a charge stopping (cut-off) portion, a current sensor 183 that is used as a detecting portion to detect when charging is stopped (cut-off), and the power ECU 20 for controlling the charge cut-off relay 174 and the current sensor 183. The response function may be said to be a protection function for the HV battery 7.

Hereinafter, each of these constituent elements of the power control system 10 will be described in detail with reference to FIG. 2.

The charging inlet 15 is a charging port for receiving AC power from an AC power supply outside of the vehicle, and is shaped such that a charge connector 221 of the charge cable 22 can be plugged into (i.e., connected to) it.

The emergency power supply outlet 16 is shaped just like a commercial power supply receptacle of a typical home, such that a receptacle plug 41 of the household electrical appliance 40 or a receptacle plug 222 of the charge cable 22 or the like is able to be detachably and electrically connected to the emergency power supply outlet 16.

The charge connector 221 that can be detachably and electrically connected to the charging inlet 15 is provided on one end of the charge cable 22, and the receptacle plug 222 that can be detachably and electrically connected to the emergency power supply outlet 16 as well as a commercial power supply receptacle is provided on the other end of the charge cable 22.

The charging apparatus 17 is provided between the HV battery 7 and the charging inlet 15. This charging apparatus 17 is provided to convert AC power input from the charging inlet 15 to DC power and then charge this DC power to the HV battery 7.

This charging apparatus 17 includes an inverter 171, a voltage converting portion 172, a voltage detecting portion 173, and a charge cut-off relay 174 and the like.

The inverter 171 converts AC power input from the charging inlet 15 to DC power. This inverter 171 is configured as a well-known inverter that is formed by a bridge circuit that includes a switching element, for example, and converts DC power to AC power by an ON/OFF operation of the switching element.

The voltage converting portion 172 converts the voltage of the DC power output from the inverter 171 to a voltage appropriate for charging the HV battery 7, and outputs it to the HV battery 7. For example, the voltage converting portion 172 is formed by a well-known DC/DC converter.

The voltage detecting portion 173 is connected between the charging inlet 15 and the inverter 171, and detects the voltage input from the charging inlet 15. More specifically, when the charge connector 221 of the charge cable 22 is plugged into the charging inlet 15, the voltage generated in the charging inlet 15 changes. The voltage detecting portion 173 is configured to detect this voltage change.

Therefore, the power ECU 20 determines that the charge connector 221 of the charge cable 22 is not plugged into the charging inlet 15 when no voltage change that occurs when the charge connector 221 of the charge cable 22 is plugged into the charging inlet 15 is detected based on the detection output of, the voltage detecting portion 173. Also, the power ECU 20 determines that the charge connector 221 of the charge cable 22 is plugged into the charging inlet 15 when a voltage change that occurs when the charge connector 221 is plugged into the charging inlet 15 is detected based on the detection output of the voltage detecting portion 173.

The charge cut-off relay 174 is provided to connect or disconnect (i.e., cut off) the voltage converting portion 172 to/from the HV battery 7. In this example embodiment, the charge cut-off relay 174 is a normally closed type of relay, which is a type of relay that is closed when not driven.

The open-closed (i.e., on-off) state of this charge cut-off relay 174 is controlled by the power ECU 20. When the charge cut-off relay 174 is not driven and is thus closed (i.e., on), power is able to be supplied to the HV battery 7 from the charging inlet 15. On the other hand, when the charge cut-off relay 174 is driven by the power ECU 20 and is thus open (i.e., off), power is unable to be supplied to the HV battery 7 from the charging inlet 15.

The power supplying apparatus 18 is provided to supply power stored in the HV battery 7 to an AC load outside of the vehicle, that is connected to the emergency power supply outlet 16.

This power supplying apparatus 18 includes a voltage converting portion 181, an voltage converting portion 182, and a current sensor 183 and the like.

The voltage converting portion 181 converts voltage of DC current discharged from the HV battery 7 to a predetermined voltage, and is formed by a well-known DC/DC converter, for example. The predetermined voltage is DC voltage corresponding to AC 100 V, for example.

The voltage converting portion 182 is provided to convert DC power output from the voltage converting portion 181 to AC power of a predetermined frequency (such as an intermediate frequency of 55 Hz that is between commercial power supply frequencies of 50 Hz and 60 Hz), and outputting this AC power from the emergency power supply outlet 16. This voltage converting portion 182 is configured as a well-known inverter that is formed by a bridge circuit that includes a switching element, for example, and converts DC power to AC power by an ON/OFF operation of the switching element.

Therefore, when the receptacle plug 222 of the charge cable 22 or the receptacle plug 41 of the household electrical appliance 40 outside of the vehicle is connected to the emergency power supply outlet 16, AC power of an intermediate frequency of 55 Hz that is between 50 Hz and 60 Hz that are commercial power supply frequencies will be supplied to the other vehicle 50 or the household electrical appliance 40 to which the charge connector 221 of the charge cable 22 is connected. Most household electrical appliances 40 are able to be used with AC power of this intermediate frequency of 55 Hz, as is well known.

The current sensor 183 detects whether current is flowing to the emergency power supply outlet 16. This current sensor 183 is connected between the emergency power supply outlet 16 and the voltage converting portion 182.

For example, when the receptacle plug 222 of the charge cable 22 or the receptacle plug 41 of the household electrical appliance 40 outside of the vehicle is connected to the emergency power supply outlet 16, current flows to the emergency power supply outlet 16, and this current is detected by the current sensor 183. The current is instantaneous current, for example.

The power ECU 20 recognizes whether the receptacle plug 222 of the charge cable 22 or the receptacle plug 41 of the household electrical appliance 40 outside of the vehicle is connected to the emergency power supply outlet 16, based on the detection output from the current sensor 183.

More specifically, when it is detected that the current is flowing based on the detection output of the current sensor 183, the power ECU 20 determines that the receptacle plug 222 of the charge cable 22 or the receptacle plug 41 of the household electrical appliance 40 outside of the vehicle is connected to the emergency power supply outlet 16. On the other hand, when it is detected that the current is not flowing based on the detection output of the current sensor 183, the power ECU 20 determines that the receptacle plug 222 of the charge cable 22 or the receptacle plug 41 of the household electrical appliance 40 outside of the vehicle is not plugged into the emergency power supply outlet 16.

The power ECU 20 has a well-known structure that includes a CPU, ROM, RAM, backup RAM, an input/output interface, and a communication interface and the like. This power ECU 20 sends and receives necessary information to and from the power management control computer 200.

The notification device 21 is provided to notify the user of the vehicle or the like that the charging inlet 15 and the emergency power supply outlet 16 have been improperly connected via the charge cable 22.

Although not shown in detail, this notification device 21 includes, for example, at least one of a display portion for displaying a warning regarding the improper connection, or a speaker or the like for outputting a warning sound regarding the improper connection. Operation of this notification device 21 is controlled by the power ECU 20.

Next, operation relating to charge/discharge control of the HV battery 7 will be described in detail with reference to the flowchart in FIG. 3. The routine in this flowchart is executed by the power ECU 20.

In step SI, it is determined whether the receptacle plug 41 of the household electrical appliance 40 or the receptacle plug 222 of the charge cable 22. is plugged into the emergency power supply outlet 16. This determination is made based on the detection output of the current sensor 183 of the power supplying apparatus 18.

Here, if the receptacle plug 41 of the household electrical appliance 40 or the receptacle plug 222 of the charge cable 22 is not plugged into the emergency power supply outlet 16, the determination in step S1 is No and the process returns to step S1.

On the other hand, if the receptacle plug 41 of the household electrical appliance 40 or the receptacle plug 222 of the charge cable 22 is plugged into the emergency power supply outlet 16, the determination in step S1 is Yes and the process proceeds on to step S2.

If the receptacle plug 41 of the household electrical appliance 40 or the receptacle plug 222 of the charge cable 22 is plugged into the emergency power supply outlet 16, the voltage converting portion 181 of the power supplying apparatus 18 converts the voltage of the DC power discharged from the HV battery 7 to a predetermined voltage, and moreover, the voltage converting portion 182 converts this DC power to AC power of a predetermined frequency, which is then output to the emergency power supply outlet 16. The predetermined voltage is DC voltage corresponding to AC 100 V, for example. The predetermined frequency is an intermediate frequency of 55 Hz that is between 50 Hz and 60 Hz that are commercial power supply frequencies, for example.

In step S2, it is determined whether the charge connector 221 of the charge cable 22 is plugged into the charging inlet 15. This determination is made based on the detection output of the voltage detecting portion 173 of the charging apparatus 17.

Here, if the charge connector 221 of the charge cable 22 is not plugged into the charging inlet 15, the determination in step S2 is No, and the process returns to step S1.

On the other hand, if the charge connector 221 of the charge cable 22 is plugged into the charging inlet 15, the determination in step S2 is Yes, and the process proceeds on to step S3.

If the charge connector 221 of the charge cable 22 is plugged into the charging inlet 15, the charging apparatus 17 charges the input power to the HV battery 7.

In step S3, it is determined whether the frequency of the AC voltage input to the charging inlet 15 matches a determining value α specified in advance.

The frequency of the AC voltage supplied to the charging inlet 15 is detected by the voltage detecting portion 173 of the charging apparatus 17. Also, the determining value α is set to the same value as the frequency of the AC voltage output from the power supplying apparatus 18 (e.g., 55 Hz).

Therefore, if the commercial power supply 30 is properly connected to the charging inlet 15 via the charge cable 22, the frequency of the AC voltage input to the charging inlet 15 from the commercial power supply 30 will be 50 Hz or 60 Hz, for example, so it will not match the determining value α. However, if the charging inlet 15 is improperly connected to the emergency power supply outlet 16 via the charge cable 22, the frequency of the AC voltage input to the charging inlet 15 from the HV battery 7 of the host vehicle will be an intermediate frequency of 55 Hz that is between 50 Hz and 60 Hz that are commercial power supply frequencies, so it will match the determining value α.

Therefore, if the frequency of the AC voltage input to the charging inlet 15 does not match the determining value α, it can be said that the connection is a proper connection, so the determination in step S3 is No and this cycle of the routine in the flowchart ends. Accordingly, charging performed according to step S2 is continued.

However, if the frequency of the AC voltage input to the charging inlet 15 matches the determining value α, it can be said that the connection is an improper connection, so the determination in step S3 is Yes and the process proceeds on to step S4.

In step S4, charging by the charging apparatus 17 is stopped. More specifically, in step S4, the supply of voltage from the charging apparatus 17 to the HV battery 7 is cut off by opening the charge cut-off relay 174 of the charging apparatus 17.

Then, next in FIG. 5, it is determined whether the supply of current to the power supplying apparatus 18 has been cut-off based on the detection output of the current sensor 183 of the power supplying apparatus 18.

Here, if it is determined based on the detection output of the current sensor 183 that the supply of current, to the power supplying apparatus 18 is not cut off, the determination in step S5 is No and the process proceeds on to step S6.

In step S6, charging to the HV battery 7 by the charging apparatus 17 is resumed. That is, voltage is allowed to be supplied to the HV battery 7 from the charging apparatus 17 by closing the charge cut-off relay 174 of the charging apparatus 17. Then this cycle of the routine in the flowchart ends.

However, if it is determined based on the detection output of the current sensor 183 that the supply of current to the power supplying apparatus 18 is cut off, the determination in step S5 is Yes and the process proceeds on to step S7.

In step S7, a notifying operation indicating that there is an improper connection is performed by activating the notification device 21, which prompts the user of the vehicle to correct the improper connection.

Then the process proceeds on to step S8, where the charging that is stopped in step S4 continues to be stopped (i.e., a charging-stopped state is continued). In this specification, a state in which charging is stopped will be referred to as a "charging-stopped state". Then this cycle of the routine in the flowchart ends. Continuing this charging-stopped state means keeping the charge cut-off relay 174 open.

Figure 3:
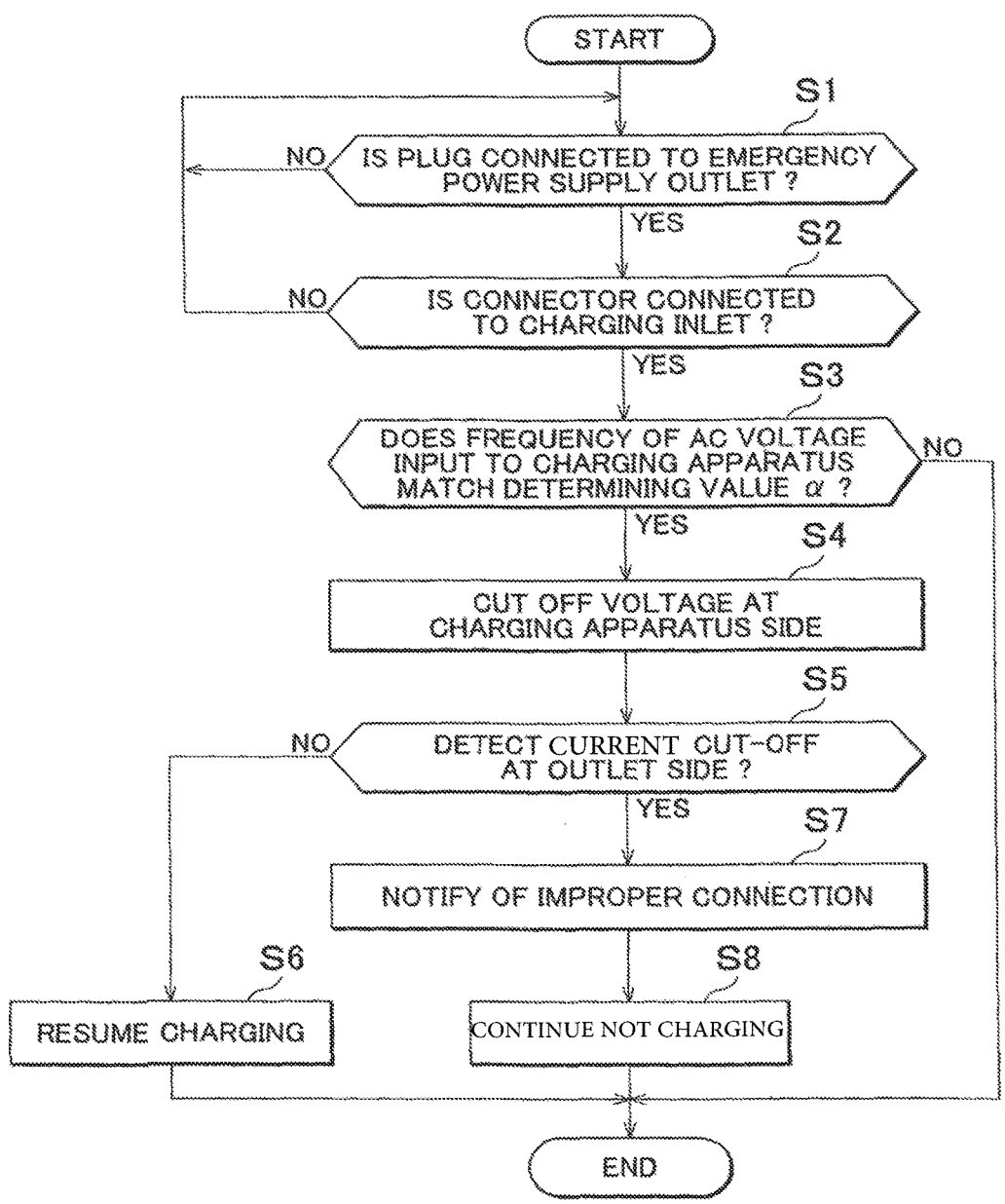
FIG. 3 is a flowchart illustrating operation related to power control of the hybrid vehicle in FIG. 1.

For reference, as shown in FIG. 4, when the charging inlet 15 and the emergency power supply outlet 16 are improperly connected together by the single charge cable 22, this improper connection is detected by steps S1 to S5 in the flowchart in FIG. 3, so charging to the HV battery 7 is stopped and the user of the vehicle or the like is notified of this improper connection by the notification device 21, by steps S7 and S8 in the flowchart in FIG. 3.

However, cases in which an appropriate device is properly connected to the charging inlet 15 and the emergency power supply outlet 16 via the charge cable 22 or the like, as shown in FIGS. 5 to 7, are as described below.

First, FIG. 5 is a view of a mode in which the receptacle plug 41 of the household electrical appliance 40 or the other vehicle 50 is connected via the charge cable 22 to the emergency power supply outlet 16 of the hybrid vehicle (referred to as the "host vehicle") in this example embodiment.

In this case, with the host vehicle, only the emergency power supply outlet 16 is being used, so the determination in step S2 in the flowchart in FIG. 3 is No. Thus, the steps related to the improper connection detection and response functions (i.e., steps S3 to S8) are not performed.

Also, with the other vehicle 50, only the charging inlet 15 is being used, so the determination in step S1 of the flowchart in FIG. 3 is No. Thus, the steps related to the improper connection detection and response functions (i.e., steps S3 to S8) are not performed. Therefore, power is able to be supplied from the host vehicle to the household electrical appliance 40 or the other vehicle 50, and the other vehicle 50 is able to charge the power supplied from the host vehicle via the charge cable 22.

FIG. 6 is a view of a mode in which the receptacle plug 41 of the household electrical appliance 40 is connected to the emergency power supply outlet 16 of the hybrid vehicle (referred to as the "host vehicle") of the example embodiment, and the other vehicle 50 is connected via the charge cable 22 to the charging inlet 15 of the host vehicle.

In this example, with the host vehicle, both the charging inlet 15 and the emergency power supply outlet 16 are being used, so the determinations in steps S1 and S2 of the flowchart in FIG. 3 are both Yes. Thus, the steps related to the improper connection detection and response functions (i.e., steps S3 to S8) are performed. Also, the determination in step S5 of the flowchart in FIG. 3 is No, so it is determined that there is not an improper connection, and charging is resumed in step S6. Therefore, power is able to be supplied to the household electrical appliance 40 from the host vehicle, while the host vehicle receives power from the other vehicle 50 via the charge cable 22.

Meanwhile, with the other vehicle 50, only the emergency power supply outlet 16 is being used, so the determination in step S2 of the flowchart in FIG. 3 is No. Thus, the steps related to the improper connection detection and response functions (i.e., steps S3 to S8) are not performed. Therefore, the other vehicle 50 is able to supply power to the host vehicle via the charge cable 22.

Also, FIG. 7 is a view of a mode in which the commercial power supply 30 is connected via the charge cable 22 to the charging inlet 15 of the hybrid vehicle (referred to as the "host vehicle") of the example embodiment, and the other vehicle 50 is connected via the charge cable 22 to the emergency power supply outlet 16 of the host vehicle.

In this example, with the host vehicle, both the charging inlet 15 and the emergency power supply outlet 16 are being used, so the steps related to the improper connection detection and response functions (i.e., steps S3 to S8) are performed, but it is determined that there is not an improper connection due to the fact that the determination in step S3 of the flowchart in FIG. 3 is No. Therefore, power is able to be supplied to the other vehicle 50 from the host vehicle via the charge cable 22, while the host vehicle receives power from the commercial power supply 30 via the charge cable 22.

Meanwhile, with the other vehicle 50, only the charging inlet 15 is being used, so the determination in step S1 of the flowchart in FIG. 3 is No. Thus, the steps related to the improper connection detection and response functions (i.e., steps S3 to S8) are not performed. Therefore, the other vehicle 50 is able to charge the power that is supplied from the host vehicle via the charge cable 22.

If the receptacle plug 41 of the household electrical appliance 40 is connected to the emergency power supply outlet 16 of the other vehicle 50, as shown by the virtual line, in the state shown in FIG. 7, both the charging inlet 15 and the emergency power supply outlet 16 of the other vehicle 50 as well would be being used, so the determinations in steps S1 and S2 of the flowchart in FIG. 3 would both be Yes. Thus, the steps related to the improper connection detection and response functions (i.e., steps S3 to S8) would be performed.

In this case, with the other vehicle 50, it is determined that there is not an improper connection due to the fact that the determination in step S5 of the flowchart in FIG. 3 is No, so charging is resumed in step S6. Therefore, power is able to be supplied to the household electrical appliance 40 from the other vehicle 50, while the other vehicle 50 receives power from the host vehicle via the charge cable 22.

As described above, the power control system 10 for a vehicle of the example embodiment to which the invention is applied is able to stop charging to the HV battery 7 by the charging apparatus 17 when the charging inlet 15 is improperly connected to the emergency power supply outlet 16 via the charge cable 22. As a result, when the improper connection occurs, power loss generated following charging is able to be suppressed or prevented, so a problem of the amount of power stored in the HV battery 7 gradually decreasing is able to be prevented.

Also, in this example embodiment, a notifying operation is performed by the notification device 21 when the improper connection occurs, so the vehicle user or the like is able to quickly be made aware of the fact, and is thus able to respond to quickly correct the improper connection.

Moreover, when it is detected that the receptacle plug 41 of the household electrical appliance 40 or the receptacle plug 222 of the charge cable 22 is connected to the emergency power supply outlet 16, AC power output from the emergency power supply outlet 16 (e.g., an intermediate frequency of 55 Hz that is between commercial power supply frequencies of 50 Hz and 60 Hz) is able to be supplied to the household electrical appliance 40 that is connected to the emergency power supply outlet 16 or the other vehicle 50 to which the charge connector 221 of the charge cable 22 is connected, during the period from the time of the detection until a determination is made as to whether there is an improper connection.

As a result, if the receptacle plug 41 of the household electrical appliance 40 or the receptacle plug 222 of the charge cable 22 is plugged into the emergency power supply outlet 16, it is possible to operate the household electrical appliance 40 that is connected to the emergency power supply outlet 16 or the other vehicle 50 to which the charge connector 221 of the charge cable 22 is connected, even during the improper connection determining period, and the like, so usability is improved.

The invention is not limited only to the example embodiments described above. That is, appropriate modifications are also possible within the scope of the claims and within a scope equivalent to this scope.

In the example embodiment described above, an example is given in which the invention is applied to a hybrid vehicle provided with the engine 1 and the motor-generators MG1 and MG2, but the invention is not limited to this. For example, the invention may also be applied to an electric vehicle provided with only an electric motor.

In the example embodiment described above, an example is given in which, when it is detected that the charging inlet 15 and the emergency power supply outlet 16 of the hybrid vehicle are improperly connected together by the charge cable 22, charging to the HV battery 7 is stopped and a notifying operation indicating that the improper connection has occurred is performed, but the invention is not limited to this. For example, the invention also includes a case in which only the charging is stopped when the improper connection is detected.

In the example embodiment described above, an example is given in which the charge cable 22 is used to connect the hybrid vehicle to the commercial power supply 30, as well as to connect the hybrid vehicle (the host vehicle) to another vehicle, but the invention is not limited to this.

For example, the charging inlet 15 of the hybrid vehicle may be a plug that is the same shape as a receptacle plug that can be plugged into a commercial power supply receptacle, and at least one cable of the charging inlet 15 or the emergency power supply outlet 16 may be configured so as to be able to be pulled out from and retracted into a vehicle. In this case, if the charging inlet 15 (or the emergency power supply outlet 16) is pulled out from the vehicle, it may end up being improperly connected to the emergency power supply outlet 16 (or the charging inlet 15). In this case as well, if the invention is applied, the improper connection is able to be detected and responded to.

The invention may preferably be used for a vehicle power control system provided with a charging terminal for inputting power to a secondary battery from outside, and a discharging terminal for outputting power from the secondary battery to outside.

Also, the vehicle power control system of the invention may be applied to a hybrid vehicle having both an engine and an electric motor as a drive source, or an electric vehicle provided only with an electric motor, or the like, that has a secondary battery for storing power to be supplied to the electric motor.

The invention claimed is:
1. A power control system for a vehicle, the power control system comprising:
  a secondary battery;
  a charging terminal capable of connecting to a power supply terminal of an alternating current power supply;
  a charging apparatus configured to be input alternating current power from the charging terminal, the charging apparatus being configured to convert the alternating current power to direct current power and charge this direct current power to the secondary battery;

a discharging terminal capable of connecting to a power receiving terminal of an alternating current load and the charging terminal;

a power supplying apparatus configured to convert the direct current power from the secondary battery to alternating current power and output this alternating current power from the discharging terminal, the power supplying apparatus including a current sensor configured to detect whether current is flowing through the power supplying apparatus; and a power electronic control unit configured to control the charging apparatus and the power supplying apparatus, wherein the power electronic control unit is configured to stop charging to the secondary battery when a connecting terminal is connected to each of both the charging terminal and the discharging terminal, wherein the power electronic control unit is configured to continue to stop the charging when the current sensor detects that the current has stopped flowing through the power supplying apparatus, and the power electronic control unit is configured to resume charging when the current sensor detects that the current is still flowing through the power supplying apparatus, wherein the power electronic control unit is configured to stop charging to the secondary battery when (i) the connecting terminal is connected to each of both the charging terminal and the discharging terminal, and (ii) a frequency of alternating current power input to the charging terminal matches a predetermined frequency, and wherein the predetermined frequency differs from 50 Hz and 60 Hz, which are standard frequencies of a commercial power supply.

2. The power control system according to claim 1, wherein the power electronic control unit is configured to also notify that improper charging is occurring, when continuing to stop the charging.

3. A power control method of a vehicle that includes a secondary battery, a charging terminal capable of connecting to a power supply terminal of an alternating current power supply, a charging apparatus, a discharging terminal capable of connecting to a power receiving terminal of an alternating current load and the charging terminal, a power supplying apparatus, and a power electronic control unit, the power control method comprising:

converting alternating current power input from the charging terminal to direct current power and charging this direct current power to the secondary battery, with the charging apparatus;

converting the direct current power from the secondary battery to alternating current power and outputting this alternating current power from the discharging terminal, with the power supplying apparatus;

stopping charging to the secondary battery with the power electronic control unit when a connecting terminal is connected to each of both the charging terminal and the discharging terminal; and continuing to stop the charging when a current sensor provided in the power supplying apparatus detects that the current has stopped flowing through the power supplying apparatus, and resuming charging when the current sensor detects that the current is still flowing through the power supplying apparatus, wherein the charging to the secondary battery is stopped by the power electronic control unit when (i) the connecting terminal is connected to each of both the charging terminal and the discharging terminal, and (ii) a frequency of alternating current power input to the charging terminal matches a predetermined frequency, and wherein the predetermined frequency differs from 50 Hz and 60 Hz, which are standard frequencies of a commercial power supply.

4. The power control method according to claim 3, further comprising:

notifying, with the power electronic control unit, that improper charging is occurring, when the charging continues to be stopped.

* * * * *